United States Patent [19]

Tsujita

[11] Patent Number: 5,117,956
[45] Date of Patent: Jun. 2, 1992

[54] HYDRAULIC TRANSMISSION COUPLING APPARATUS

[75] Inventor: Mitsuhiro Tsujita, Osaka, Japan

[73] Assignee: Koyo Seiko Co., Ltd., Osaka, Japan

[21] Appl. No.: 533,631

[22] Filed: Jun. 5, 1990

[30] Foreign Application Priority Data

Jun. 7, 1989 [JP] Japan .................... 1-146136

[51] Int. Cl.$^5$ .................. F16D 31/02; F16D 31/08
[52] U.S. Cl. ..................... 192/60; 475/231; 475/249
[58] Field of Search ........... 475/249, 231; 180/249; 192/60, 59

[56] References Cited

U.S. PATENT DOCUMENTS

| | | | |
|---|---|---|---|
| 3,393,583 | 6/1968 | Mueller | 475/160 X |
| 3,831,461 | 8/1974 | Mueller | 192/60 X |
| 4,676,336 | 6/1987 | Hiramatsu et al. | 180/233 |
| 4,727,966 | 3/1988 | Hiramatsu et al. | 192/0.033 |
| 4,829,769 | 5/1989 | Hiramatsu | 192/60 X |
| 4,850,447 | 7/1989 | Hirakushi et al. | 180/248 |
| 4,881,626 | 11/1989 | Hiramatsu | 192/60 |
| 4,919,248 | 4/1990 | Hiramatsu et al. | 192/61 |
| 4,995,491 | 2/1991 | Hiramatsu et al. | 192/60 X |

FOREIGN PATENT DOCUMENTS 342598 2/1931 United Kingdom .................. 192/60

*Primary Examiner*—Rodney H. Bonck
*Attorney, Agent, or Firm*—Townsend and Townsend

[57] ABSTRACT

A hydraulic transmission coupling apparatus for transmitting a driving force to a front wheel driving shaft and a rear wheel driving shaft of a four-wheel drive vehicle, which is provided with a pump to generate hydraulic pressure corresponding to a rotation speed difference between both driving shafts, a reserving part for reserving hydraulic fluid, a fluid room disposed in the circulation passage of hydraulic fluid, and a piston located in the fluid room and sliding while subjected to the hydraulic pressure in the reserving part at one side thereof. When the volume of hydraulic fluid varies with the variation in fluid temperature, the piston slides and, as a result, the internal volume of the fluid room varies so as to absorb the volume variation of hydraulic fluid.

10 Claims, 4 Drawing Sheets

Fig. 1

HYDRAULIC TRANSMISSION COUPLING APPARATUS

BACKGROUND OF THE INVENTION

1. Field of the Invention

This invention relates to a hydraulic transmission coupling apparatus for enabling four-wheel drive by distributing the driving force to the front and rear wheels through the hydraulic pressure generated by a hydraulic pump interposed between both wheels.

2. Description of Related Art

A four-wheel drive vehicle driven by the driving force of the engine transmitted to the front and rear wheels is in the limelight because of its capability of providing stability and comfort in running regardless of the road and running conditions. Four-wheel drive is enabled basically by directly connecting the front and rear wheels to the engine as a driving source. However, the four-wheel drive vehicle as above is followed by a problem that the drive is difficult for general drivers on account of peculiar behavior of the vehicle at the time of fast steering because of the so called "tight corner breaking phenomenon" arising from the inability to asborb a rotation speed difference between the front and rear wheels. Recently, therefore, a so-called "full-time four-wheel drive vehicle" equipped with a hydraulic transmission coupling apparatus which distributes the driving force to the front and rear wheels correspondingly to the rotation speed difference between both wheels while absorbing the pressure difference, has been most prevalent. An apparatus utilizing hydraulic pressure generated by an oil hydraulic pump has been developed as one of a plurality of hydraulic transmission coupling apparatuses.

This hydraulic transmission coupling apparatus is of such structure that a speed difference control part, which controls the speed difference between the front and rear wheels with the force corresponding thereto, is added to, for example, the differential gear unit disposed in the middle of a system for transmitting the force from the engine to the front and rear wheels. As a means for generating such controlling force as above at the speed difference control part, oil hydraulic pressure generated by the oil hydraulic pump is utilized.

The differential gear unit comprises a plurality of planet wheels revolving on a common orbital axis, rotating independently from each other, and adapted to mesh with a pair of differential gears respectively, the unit being a mechanical element for distributing the force inputted into the orbital axis to the output ends individually interlocked with the differential gears. Since the rotation speed difference caused between the output ends is absorbed by the rotation of the planet gears, force transmission to output ends having rotation speeds different from each other is possible. Accordingly, the provision of a differential gear unit (central differential gear unit) comprising a pair of differential gears interlocked with the front and rear wheels respectively and interlocking of the orbital axes of the planet gears with the engine ensures a four-wheel drive vehicle capable of absorbing the rotation speed difference between the front and rear wheels and of transmitting the driving force to both wheels. The differential gear unit, however, has a transmission characteristic such as distributing the driving force more to the output side of a high rotation speed than to the other when distributing the force to the output ends having rotation speeds different from each other. Thus, in the four-wheel drive vehicle as described above, when the wheels on any one of the front and rear sides are at an idle, a large part of the driving force of the engine is transmitted to the wheels on the idling side whereas, disadvantageously, only a small part to the wheels on the non-idling side requiring the driving force.

The above-mentioned speed difference control part is provided for applying the controlling force to a pair of differential gears in the differential gear unit corresponding to the degree of rotation speed difference between gears so as to secure an amount of the driving force to be distributed to the side of low rotation speed. The speed difference control part utilizing the oil hydraulic pressure generated by the oil hydraulic pump is provided with a casing rotating in association with the differential gears on one side, that is, the wheels on any one of the front and rear sides, a rotor contained in the casing and rotating in association with the differential gears on the other side, and a pump room between the casing and rotor. Relative rotations corresponding to the rotation speed difference between the front and rear wheels are caused between the casing and rotor and the hydraulic pressure increasing or decreasing correspondingly to the number of relative rotations is generated in the pump room. The oil pressure thus generated acts upon the space between the casing and rotor for suppressing the aforesaid relative rotations. An amount of the driving force to be distributed to the front and rear wheels interlocking with the casing and rotor respectively is determined to be equalized through the abovesaid oil pressure. Thus, the disadvantage in the differential gear unit as described earlier is eliminated and four-wheel drive is made possible as desired.

In this speed difference control part, since the casing and rotor rotate together, it is difficult to supply hydraulic oil into the pump room from a tank fixedly disposed outside the casing and rotor. Therefore, an oil reserving part for reserving hydraulic oil is formed integrally with the casing while utilizing an annular room formed between a cylindrical surrounding member disposed to surround the casing and the periphery of the casing, and, an oil suction passage and an oil discharge passage communicating the oil reserving part with the pump room are formed in respective parts of the casing and rotor so that hydraulic oil reserved in the oil reserving part may be used while circulated between the oil reserving part and pump room. A quantity of hydraulic oil to be reserved in the oil reserving part is limited on account of the necessity to reduce the size of the hydraulic transmission coupling apparatus and the weight at the time of rotation thereof whereas pressure increase in the pump room every time of circulation and pressure decrease at the time of return of circulating oil to the oil reserving part are repeated. When the vehicle runs for a long time with a large difference in rotation speed between the front and rear wheels, for example, when running on the snowy road or mountain road, a temperature of hydraulic oil rises considerably high whereas, during parking in cold environments, the temperature falls considerably low because of contact of oil with the atmosphere. Such temperature variation causes volume variation of the hydraulic oil, which results in an internal pressure rise with the rise of oil temperature as well as an internal pressure fall with the fall of oil temperature in the oil reserving part. In the former case, outward leakage of hydraulic oil from the oil reserving part occurs and, in the latter case, the ingress of ambient air from the outside occurs, both cases interfering with the normal performance of the speed difference control part.

In the speed difference control part utilizing the oil pressure generated by the oil hydraulic pump, means to absorb the volume variation of hydraulic oil occurring with oil temperature variation is indispensable. Means to absorb the volume variation depending on the deformation of a diaphragm disposed in the oil reserving part is known (U.S. Pat. No. 3,393,583). This structure, however, suffers such problems that unrequired deformation of the diaphragm is caused by the action of centrifugal force following the rotation of the casing and, particularly, at the time of high speed running of the vehicle recausing a strong centrifugal force, normal absorption of the volume variation is impossible.

For eliminating the influence of centrifugal force, the applicant of this invention have previously proposed a hydraulic transmission coupling apparatus wherein a piston member is disposed slidably in the axial length direction in a hollow space formed in the position of the axis of the rotary shaft of the rotor so as to introduce the internal pressure in the oil reserving part into one side of the piston member for absorbing the volume variation in hydraulic oil with the variation in the internal volume of the hollow space following sliding of the piston member, and, further, another hydraulic transmission coupling apparatus wherein the abovesaid surrounding member located outside the casing for forming the oil reserving part so that the internal volume of the oil reserving part may be directly varied with sliding of the surrounding member partly subjected to the internal pressure in the oil reserving part for absorbing the volume variation in the oil reserving part. These apparatuses are free of apprehension that the piston member and surrounding member engaged in absorption of the volume variation slide in the axial length direction and the radially acting centrifugal force exerts influence upon sliding, whereby the influence of centrifugal force is eliminated and adequate absorption of the volume variation is possible.

The structure of the former is subject to a limit to the design that a hollow space must be provided for the rotary shaft of the rotor. Further, because of sliding of the piston member performed in the hollow space formed in the position of the axial center thereof, an elongated sliding stroke is required for enabling sure absorption of the volume variation in a wide range from the presumed highest oil temperature to the lowest one, thereby hampering size reduction in the whole of the apparatus.

In the latter permitting sliding of the surrounding member, even a relatively short sliding stroke enables absorption of a large variation in volume and requires no increase in the axial length. However, variation in external shape of the hydraulic transmission coupling apparatus caused by sliding of the surrounding member imposes a limit that an installation space must be provided in consideration of the abovesaid variation in external shape when setting the hydraulic transmission coupling apparatus.

SUMMARY OF THE INVENTION

An object of this invention is to provide a hydraulic transmission coupling apparatus capable of adequately absorbing the volume variation in hydraulic fluid in a wide range of temperature.

Another object of this invention is to provide a hydraulic transmission coupling apparatus capable of adequately absorbing the volume variation in hydraulic fluid without being limited in the design and installation thereof.

Further object of this invention is to provide a hydraulic transmission coupling apparatus capable of adequately absorbing the volume variation in hydraulic fluid without resulting in an increase in size of the apparatus.

A hydraulic transmission coupling apparatus of this invention is provided with: pump means for generating hydraulic pressure corresponding to a rotation speed difference between two rotary shafts which transmit driving force and are connected to pump means; a reserving part for reserving hydraulic fluid to be fed to and discharged from the pump means; a circulation passage for circulating hydraulic fluid between the reserving part and pumping means; a fluid room located in the circulation passage; and a sliding member disposed in the fluid room and sliding when subjected to the fluid pressure at one side thereof.

The two rotary shafts are a front wheel driving shaft connected to the front wheels of a four-wheel drive vehicle and a rear wheel driving shaft connected to the rear wheels, and, for example, the front wheel driving shaft is connected to a casing whereas the rear one is connected to a rotor contained in the casing. In particular, hydraulic fluid is oil and an oil hydraulic pump such as vane pump can be used as pump means.

In the hydraulic transmission coupling apparatus of this invention, the driving force is distributed to the front and rear wheels trough hydraulic pressure generated with the circulation of hydraulic fluid caused between the pump means and the reserving part. When the volume of hydraulic fluid reserved in the reserving part varies, the sliding member partly subjected to the internal pressure of the reserving part varying with the volume variation in hydraulic fluid slides inside the fluid room. Then, the volume variation in hydraulic fluid is absorbed with the variation in internal volume of the fluid room caused by sliding of the sliding member. Absorption of the volume variation is performed without being influenced by the centrifugal force generated with the revolution of the hydraulic transmission coupling apparatus, thereby causing no change of the external shape. The rotary shaft may be either fully solid or hollow.

The above and further objects and features of the invention will more fully be apparent from the following detailed description with accompanying drawings.

BRIEF DESCRIPTION OF THE DRAWINGS

FIG. 1 is a vertical sectional view of an example of the hydraulic transmission coupling apparatus of this invention;

DESCRIPTION OF THE PREFERRED EMBODIMENTS

Figure 1:
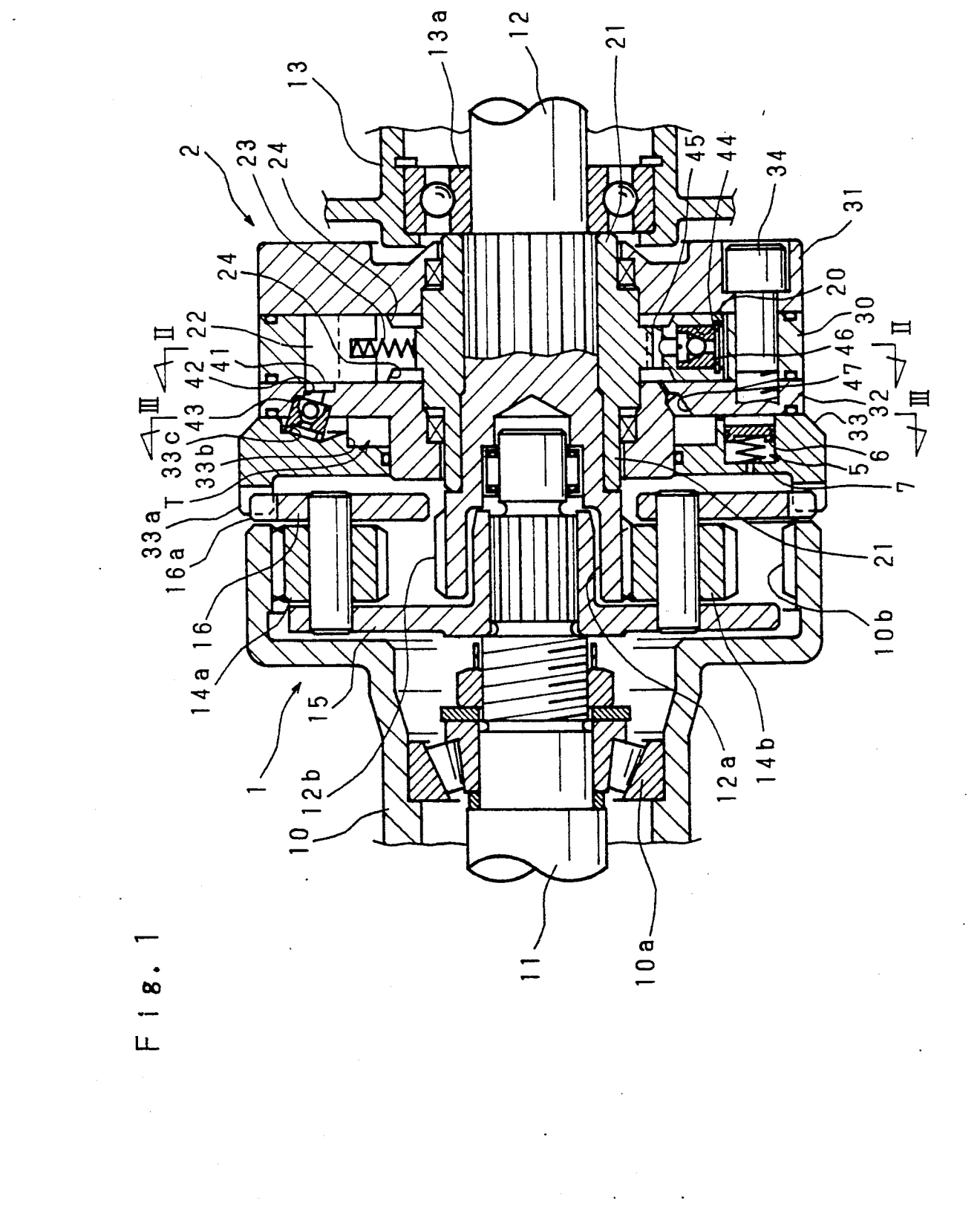
Figure 2:
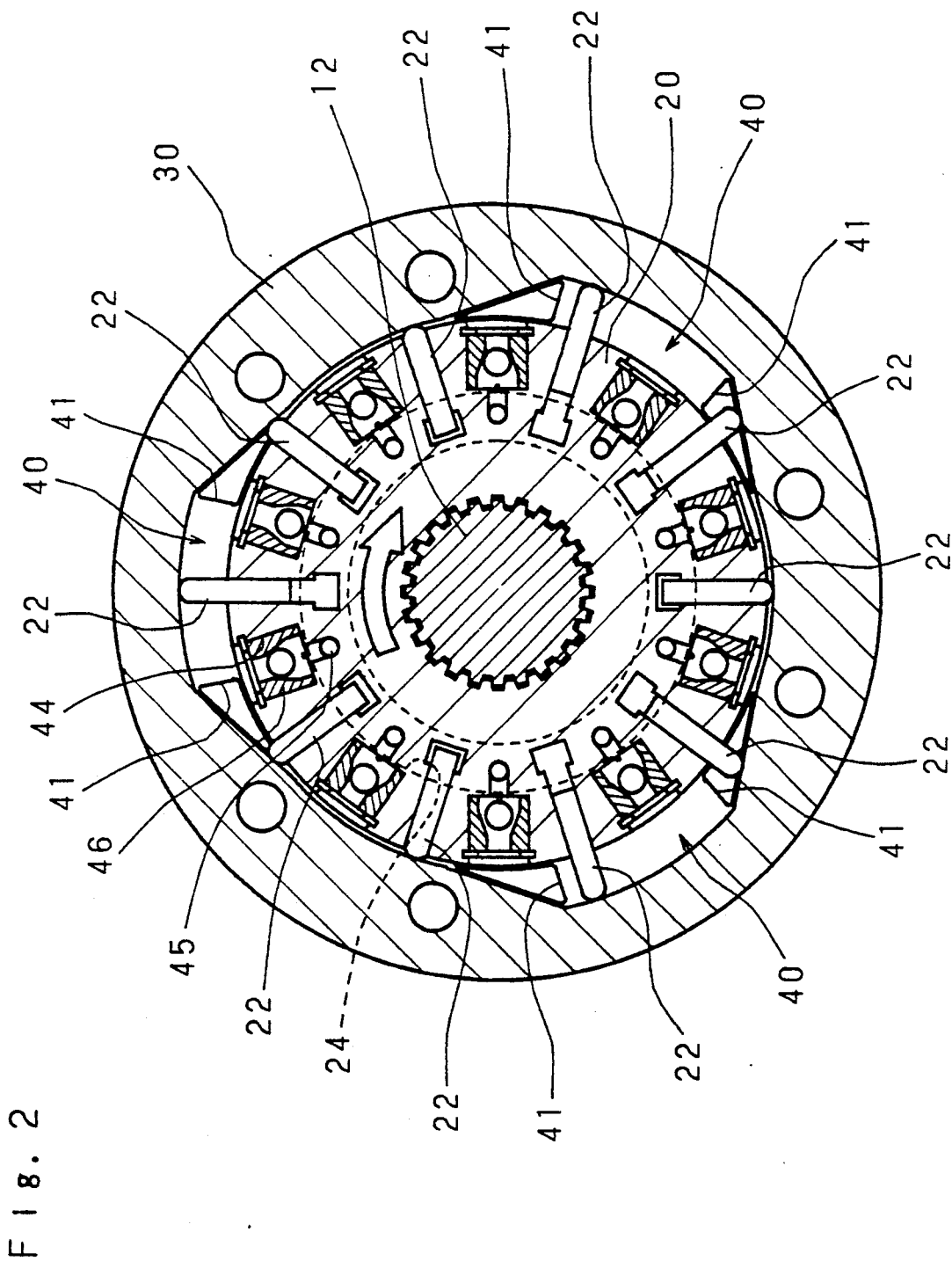
FIG. 2 is a sectional view taken along the line II—II in FIG. 1.

This invention will be described in detail with reference to the drawings illustrating an embodiment thereof. FIG. 1 is a vertical sectional view showing an example of the hydraulic transmission coupling apparatus of this invention (called "an apparatus of this invention" hereinafter) used for the four-wheel drive vehicle.

In the drawing, the reference numeral 1 indicates a differential gear unit disposed in the middle of the transmission system extending from an engine as a driving source to the front and rear wheels and distributing the driving force to the wheels while absorbing the rotation speed difference between both wheels, and the numeral 2 represents a speed difference control part added to the differential gear unit 1 and controlling the rotation speed difference between the wheels with the oil pressure generated by an oil hydraulic pump.

First, the structure and action of the differential gear unit 1 will be described. The differential gear unit 1 shown in FIG. 1 includes spur wheels for reducing the axial length. In the drawing, the numeral 10 indicates an input housing having a diametrically large cylindrical part coaxially connected to a diametrically small cylindrical part and supported by a part of the vehicle body. Driving force of the engine (not shown) is transmitted to the other end of the diametrically small cylindrical part and the input housing 10 rotates around the shaft axis. The first output shaft 11 of the differential gear unit 1 is coaxially and rotatably supported in the input housing 10 by a tapered-roller bearing 10a fixedly fitted into the diametrally small cylindrical part. A second output shaft 12 is rotatably supported by a ball bearing 13a fixedly fitted in the stationary housing 13 which is fixed to a part of the vehicle body coaxially with the input housing 10. The end of the second output shaft 12 projecting from the stationary housing 13 has a supporting hole 12a in an appropriate depth in the axial direction at the position of the axial center and is fitted into the input housing 10 in a predetermined length from the side of the diametrically large cylindrical part. The end of the first output shaft 11 is inserted into the supporting hole 12a in an appropriate length and supported by a needle-roller bearing fixedly fitted into the abovesaid hole 12a. These first and second output shafts 11 and 12 are interlocked with the front and rear wheels, respectively. For example, the first output shaft 11 and second one rotate at speeds corresponding to the rotation speeds of the front and rear wheels coaxially therewith, respectively, in the same direction.

The diametrically large cylindrical part of the input housing 10 forms an internal toothed wheel 10b composed of a large number of teeth formed on the entire inner periphery thereof. A part near the projecting end of the second output shaft 12 forms an external toothed wheel 12b composed of a large number of teeth formed on the entire outer periphery thereof. The external wheel 12b and the internal wheel 10b are coordinated in the axial length direction. In an annular space formed between the internal gear 10b and external gear 12b, a plurality of spur gears 14a, 14a, ... and 14b, 14b, ... are disposed in the circumferential direction. Among these spur gears, those 14a, 14a, ... positioned radially outward mesh with the internal gear 10b as well as gears 14b, 14b, ... positioned radially inward with the external gear 12b, and adjacent ones mesh with each other. The spur gears 14a, 14a, ... and 14b, 14b, ... are rotatably supported by respective pivotal shafts parallel with the first and second output shafts 11 and 12, respectively, between common support members 15, 16 positioned on both sides of the gears. The support member 15 on the side of the input housing 10 is provided with a cylindrical part which extends coaxially with a hollow plate pivotally supporting the spur gears 14a, 14b and is positioned on the side of the inner periphery of the hollow plate. This cylindrical part is fitted on and connected to the first output shaft 11 with a spline. The support member 15, therefore, rotates around the axis thereof in association with the first output shaft 11, and the spur gears 14a, 14b rotatably supported by the support member 15 rotate around respective pivotal shafts thereof while revolving with the rotation of the first output shaft 11. Another support member 16 is a disk-like hollow member having the diameter slightly larger than that of the support member 15 and connected to the support member 15 through the pivotal shafts of the spur gears 14a, 14b, which rotates, together with the support member 15, in association and coaxially with the first output shaft 11. The support member 16 is provided with a large number of catching teeth 16a at the entire outer periphery thereof and these catching teeth 16a are adapted to engage with the casing of a speed difference control part 2, which will be described later, outside the diametrically large part of the input housing 10.

In the differential gear unit 1 in the structure as above, the driving force of the engine transmitted to the input housing 10 is transmitted to the first output shaft 11 through the internal gear 10b formed on the inner periphery of the diametrically large part of the housing 10, spur gears 14a, 14a, ... meshing with the internal gear, and the support member 15 supporting these spur gears, and is further transmitted to the second output shaft 12 through the spur gears 14b, 14b, ... supported by the support member 15 and the external gear 12b meshing with these spur gears. The first and second output shafts 11, 12 rotate in association with the front and rear wheels, respectively, and thus a speed difference corresponding to the rotation speed difference between the front and rear wheels is caused between both output shafts 11, 12 as well as between the output shafts 11, 12 and the input housing 10. Since the speed difference between the first output shaft 11 and the input housing 10 is absorbed with the rotation of the spur gears 14a, 14a, ... disposed therebetween as well as that between the first and second output shafts 11, 12 with the rotation of the spur gears 14b, 14b, ..., transmission of the driving force from the input housing 10 to the first and second output shafts 11, 12 is performed regardless of whether or not there is a rotation speed difference between both shafts 11, 12 or between the front and rear wheels. At this time, however, on account of characteristics of the differential gear unit 1, an amount of the driving force transmitted to the first and second output shafts 11, 12 corresponds to the rotation speed difference between both output shafts 11, 12 and more driving force is transmitted to the side of higher rotation speed than to the side of lower rotation speed. Thus, when the front wheels are in idle and the rotation speed of the first output shaft 11 is exceedingly high whereas the rear wheels are restricted in rotation and the rotation speed of the second output shaft 12 is almost zero, a large part of the driving force transmitted from the engine to the input housing 10 is disadvantageously transmitted to the side of the front wheels in idle through the first output shaft 11 whereas only a small part of the driving force is transmitted to the side of the rear wheels requiring the supply of the driving force.

The speed difference control part 2 is provided for controlling the above-mentioned action of the differential gear unit 1 in distributing the driving force while generating control force increasing or decreasing correspondingly to the high or low degree of the rotation speed difference when such difference develops between the first and second output shafts 11 and 12, respectively, so as to control the speed difference in the differential gear unit 1. The speed difference control part 2 shown in the drawings comprises a vane pump as one of oil hydraulic pumps in kind and operates while utilizing the oil hydraulic pressure as a control force generated in the pump. The speed difference control part 2 is formed on the second output shaft 12 between the diametrally large cylindrical part of the input housing 10 and the stationary housing 13. FIG. 2 is a sectional side view taken along the line II—II in FIG. 1 for showing the structure of a main part of the speed difference control part 2.

The speed difference control part 2 comprises a rotor having diametrally small cylindrical boss parts 21, 21 coaxially connected to lengthwise both sides of a diametrally small cylindrical rotor proper 20, and a casing to accommodate the rotor therein coaxially and rotatably.

The rotor is fitted on the second output shaft 12 between the input housing 10 and the stationary one 13 and connected thereto with a spline so as to rotate in association with the output shaft 12. The rotor is positioned in the axial direction by adapting boss ends 21, 21 to abut on the end of the inner ring of the ball bearing 13a in the stationary housing 13 and the stepped end formed on the outside of the second output shaft 12 on the side of the external gear 12b. On the rotor proper 20, as shown in FIG. 2, a plurality of receiving grooves are formed to radially extend from the outer periphery in the depth as determined throughout the axial length in the circumferential direction at equal intervals. Vanes 22, 22, ... in the rectangular flat plate-like shape are disposed in these receiving grooves reciprocatably in the radial direction. As shown in FIG. 1, a coiled spring 23 is disposed between the base of each vane 22 and the bottom of each receiving groove. The bottoms of all receiving grooves communicate with each other through annular grooves formed on both sides of the rotor proper 20. Each vane 22 is radially outwardly pressed with biasing force of the coiled spring 23 and the oil pressure introduced as will be described later into the bottom of each receiving groove through the annular grooves 24, 24.

The casing containing the rotor in the structure as above has a circular outer periphery and internal periphery including projections arranged at equal pitches at a plurality of positions (three in this invention) on the circumference slightly diametrically larger than the diameter of the rotor proper 20, and is in such axially sectional shape as shown in FIG. 2. The casing is composed of side plates 31, 32 and pressing member 33 united coaxially and integrally with each other on both sides of a cylindrical cam ring 30 having an eccentric interior wall with an axial length roughly equal to that of the rotor proper 20. As shown in FIG. 1, the side plate 31 on one side is in the shape of a hollow disk having the roughly same outer diameter as that of the cam ring 30. The side plate 32 on the other side is in the shape in which a diametrically small and short cylinder projecting toward one side in the axial direction is connected to the radial inside of a hollow disc having an outer diameter roughly equal to that of the cam ring 30.

The pressing member 33 is in the shape of a hollow disc having an outer diameter slightly larger than that of the side plate 32 and is fitted on the outer periphery of the cylindrical part of the side plate 32. The side plate 31 and that 32 provided with the pressing member 33 fitted thereon are positioned on both sides of the cam ring 30 coaxially therewith and are adapted to be fastened to each other by a plurality of setting bolts 34, 34, ... bored on the circular plate-like part of the side plate 32 and the pressing member 33 so as to pierce the side plate 31, while starting therefrom, and the cam ring 30.

The speed difference control part 2 is in such structure that boss parts 21, 21 on both sides of the rotor proper 20 are fitted into the hollow parts of the side plates 31, 32 so as to be supported thereby and the rotor proper 20 is coaxially accommodated in a hollow space surrounded by the inner periphery face of the cam ring 30 and the side faces of the side plates 31, 32. The boss parts 21, 21 are sealed at the outside of the supported points thereof with a sealing member such as an oil seal fixedly fitted into the hollow parts of the side plates 31, 32, and project outside from the casing. Positioning of the speed difference control part 2 in the axial direction, as described above, is performed by adapting the end faces of these boss parts 21, 21 to abut on the ball bearing 13a and the stepped parts of the second output shaft 12, respectively.

The pressing member 33 is provided, at the outer periphery, with an annular part projecting in the axial direction toward the differential gear unit 1. The catching teeth 33a formed on the entire periphery of the end of the annular part are meshed with catching teeth 16a formed on the outer periphery of the support member 16. Then, the casing of the speed difference control part 2 is connected to the other support member 15 of the differential gear unit 1 through the support member 16 and the pivotal shafts of a plurality of spur gears 14a, 14b supported thereby, and rotates at the rotation speed of the supporting member 15, that is, the same rotation speed as that of the first output shaft 11. The rotor accommodated in the casing is fixedly connected to the second output shaft 12 with a spline and rotates in association therewith, whereby are caused relative rotations corresponding to the rotation speed difference between the first and second output shafts 11, 12 or between the front and rear wheels.

Figure 3:
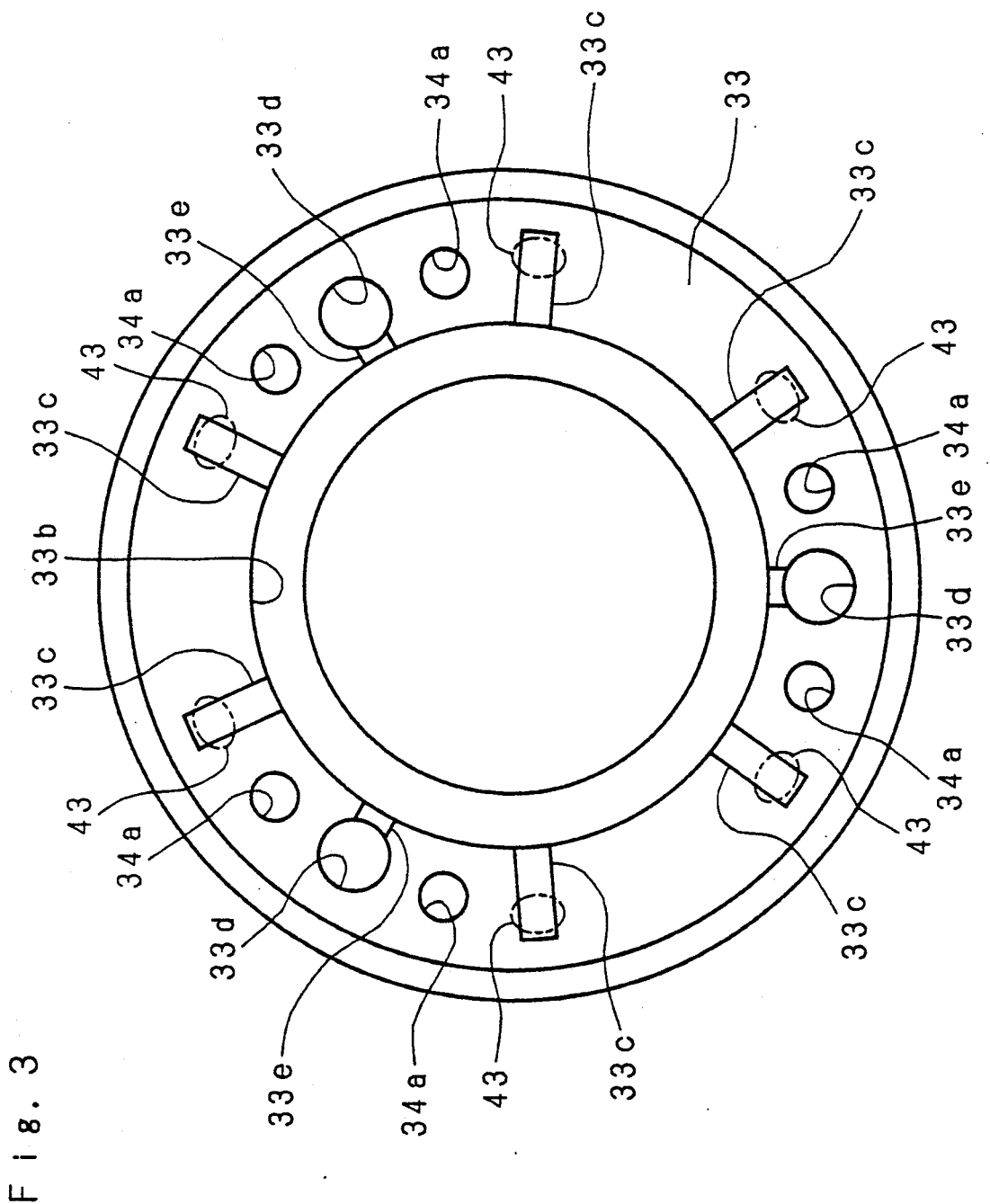
FIG. 3 is a view taken along the arrow line III—III in FIG. 1.

FIG. 3 is a view taken along the arrow line III—III in FIG. 1 and shows the contact surface of the pressing member 33 against the side plate 32. As shown in this drawing, on the contact surface of the pressing member 33, formed is an annular groove 33b having a width as fixed from the inner periphery in the radial direction as well as a depth as fixed in the depth direction throughout the circumference of the abovesaid surface. As shown in FIG. 1, when the pressing member 33 is fitted on the side plate 32, an annular space surrounded by the annular groove 33b, the side surface of the circular part of the side plate 32, and the outer peripheral surface of the cylindrical part of the side plate 32 is formed. This annular space serves as an oil reserving part T for the supply of hydraulic oil to the speed difference control part 2. A plurality of oil grooves 33c, 33c, ... extending from the annular groove 33b in the radial direction are formed on the contact surface of the pressing member 33. Six lines of such oil grooves 33c, 33c, ... in total, that is, two for each of three pump rooms 40, 40, 40 provided as will be described later between the casing and rotor, are formed in such manner as coordinated in the circumferential directions of pump rooms 40. The pressing member 33 is provided with screw holes 34a, 34a, ... which pierce this member in the depth direction and engage with the setting bolts 34, 34, .... On the contact surface of the pressing member 33, a plurality of circular holes 33d, 33d ... are bored in a certain fixed depth in positions not overlapping with those of the screw holes 34a, 34a ... and the oil grooves 33c, 33c ... in the circumferential direction so that the axial directions thereof are adapted to agree with the axial length of the pressing member 33 or the speed difference control part 2, and are adapted to communicate with the annular groove 33b through shallow oil grooves 33e, 33e, ....

Figure 4:
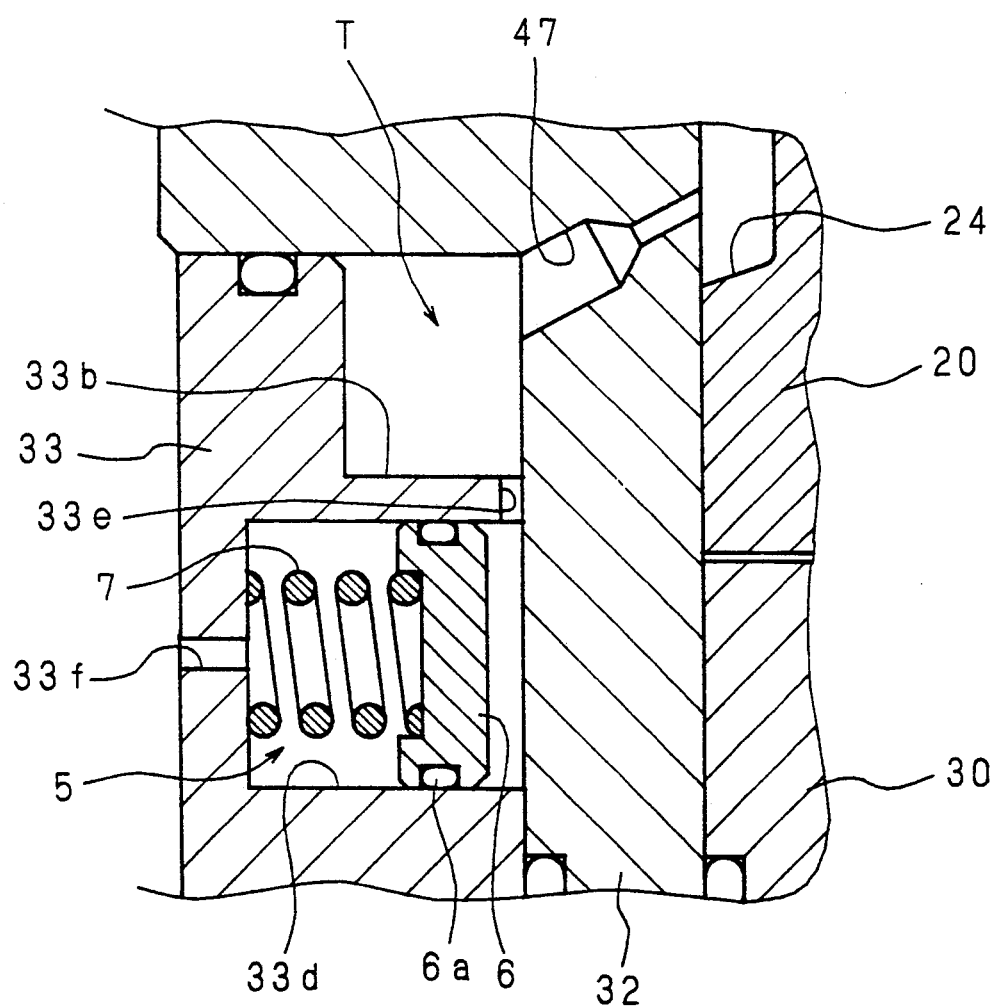
FIG. 4 is an enlarged sectional view of characteristic parts of the hydraulic transmission coupling apparatus of this invention.

FIG. 4 is an enlarged sectional view of a part near the tight contact part between the pressing member 33 in the position in which each circular hole 33d is formed and the side plate 32, showing features of the present invention. As shown in FIGS. 4 and 1, a cross-sectionally circular space 5 surrounded by the pressing member 33 and the side face of the side plate 32 is formed in the position in which the circular hole 33d is formed when the pressing member 33 is fitted on the side plate 32. A disk-like piston member 6 slidable along the axis of the circular hole 33d is fitted into the space 5. The piston member 6 is biased toward the side plate 32 by a coiled spring 7 interposed between itself and the bottom of the circular hole 33d. The space 5 is divided into two parts by an O-ring 6a wound around the piston member 6 and one part on the side of the side plate 32 communicates with the oil reserving part T formed as aforesaid by the oil groove 33e on the inner peripheral side of the pressing member 33, whereby internal pressure in the oil reserving part T is introduced into this part. The other part communicates with the outside of the casing through piercing hole 33f bored on the bottom of the circular hole 33d and through the remaining part of the pressing member 33, whereby atmospheric pressure is introduced into this part. The piston member 6 slides within the space 5 while responding to the balance between the internal pressure in the oil reserving part T acting on the side of the side plate 32 and biasing force of the coiled spring 7 acting on the opposite side. The volume of one part of the space 5 communicating with the oil reserving part T varies with sliding of the piston member 6.

As shown in FIG. 2, inside the casing accommodating the rotor proper 20, a plurality of (three in this invention) pump rooms 40, 40, 40 are formed in respective positions in which the projections on the inner periphery of the cam ring 30 are formed, so that the shape of the room is like a deformed crescent while surrounded by the outer periphery of the rotor proper 20 and the inner periphery of the cam ring 30. Each of the pump rooms 40, 40, 40 is provided with a pair of suction ports 41, 41 opening on the side of the side plate 32 at both ends in the circumferential direction. As shown in FIG. 1, at each suction port 41, one end of a suction hole 42 opens to pierce the disk part of the side plate 32 in the thickness direction. The other end of the suction hole 42 opens in the corresponding oil groove 33c on the tight contact surface of the side plate 32 against the pressing member 33. The suction port 41 communicates with the oil reserving part T through respective suction holes 42 and oil grooves 33c. A suction check valve 43 allowing flowing of oil only from the oil reserving part T to the pump room 40 is fitted into the opening end of the suction hole 42 on the side of the oil groove 33c. The circumferential positions of the oil grooves 33c, 33c, ... in FIG. 3 are coordinated in the positions at which corresponding suction holes 42, 42, ... open, in other words, the circumferential positions of a pair of suction ports 41, 41 of corresponding pump rooms 40, 40, 40. Each oil groove 33c and suction hole 42 function as an oil suction passage to the pump room 40 only when internal pressure in the pump room 40 is lower than that in the oil reserving part T at position of the suction port 41 opening correspondingly to the oil groove 33c and suction hole 42 and when each suction check valve 43 is opened. Incidentally, in FIG. 3, positions at which suction check valves 43 corresponding to the oil grooves 33c are set are shown by the two-dash chain line.

On the other hand, as shown in FIG. 2, discharge holes 44, 44, ... opening between set positions of adjacent vanes 22, 22 on the outer periphery of the rotor proper 20 and having a fixed depth in the radial direction are formed on the rotor proper 20. The bottom of each discharge hole 44 is adapted to communicate with the annular grooves 24, 24 formed on both sides of the rotor proper 20 by respective oil guide holes 45 piercing through the rotor proper 20 in the axial direction. A discharge check valve 46 permitting the flow of oil only in the radial direction, that is, the flow from the pump room 40 is fitted on each discharge hole 44 at the midway thereof. The annular groove 24 on the side of the side plate 32, as detailedly shown in FIG. 4, is adapted to communicate with the oil reserving part T through a diametrically small throttle hole 47 piercing through the disk part of the side plate 32 in the thickness direction. That is to say, the pump room 40 communicates with the oil reserving part T through the discharge holes 44, 44, ... and accompanying oil guide holes 45, 45, ... as well as through the common annular groove 24 and throttle hole 47. When the internal pressure in the pump room 40 at the opening position of an appropriate discharge hole 44 exceeds the internal pressure in the annular groove 24 communicating with all discharge holes 44, 44, ... and the discharge check valve 46 on the midway of the abovesaid discharge hole 44 is opened, all of them function as an oil discharge passage of the pump room.

As shown in FIG. 1, sealing members such as O-rings are provided for the contact surface between the cam ring 30 and the side plates 31, 32 as well as that between the side plate 32 and the pressing member 33 at the proximity of the outer peripheries of these contact surfaces. A sealing member such as an O-ring is provided for the part at which the pressing member is fitted on the side plate 32. In this way, outward oil leakage from the pump rooms 40, 40, 40 and the oil reserving part T is prevented. The sealing agent is applied to the threaded parts of the setting bolts 34, 34, ....

The action of the speed difference control part 2 in the structure as above will be described. As described above, the casing of the speed difference control part 2 rotates in association with the first output shaft 11 and the rotor rotates in association with the second output shaft 12. When there is no rotation speed difference between the front and rear wheels, that is, the rotation speed of both output shafts 11, 12 are equal to each other, the rotor and casing rotate at the same speed and the speed difference control part 2 performs no pumping operation. At this time, therefore, the driving force transmitted to the input housing 10 of the differential gear unit 1 is distributed to the first and second output shafts 11 and 12 at equal rates by the abovesaid action of the differential gear unit 1.

When a rotation speed difference exists between the first and second output shafts 11 and 12, relative rotation corresponding to the rotation speed difference between the casing rotating in association with the first output shaft 11 and the rotor rotating with the second output shaft 12 occurs in the speed difference control part 2. Forward ends of vanes 22, 22, . . . fixed to the rotor proper 20 are pressed to the inner peripheral surface of the cam ring 30 with biasing force of the coiled spring 23. These vanes 22, 22, . . . rotate, while moving forward and rearward in the radial direction along respective receiving grooves, with the rotation of the rotor, and, when relative rotation occurs as above, hydraulic oil in each of pump rooms 40, 40, 40 is sealingly retained between adjacent two vanes and rotates with the rotation of the rotor. As a result, inside each of pump rooms 40, 40, 40, the fall of pressure following the volumetric expansion of the sealingly retaining oil therein occurs on the upstream side of the relative rotating direction whereas, on the downstream side, the rise of pressure occurs with the volumetric contraction of the space. The suction hole 42 and oil groove 33c communicating with the suction port 41 opening at the upstream side serve as an oil suction passage when the suction check valve 43 opens with the fall of the internal pressure. The discharge hole 44 which opens in the pump room 40 at the downstream side and has on the midway thereof the discharge check valve 40 being opened with the abovesaid rise of internal pressure, and the oil guide hole 45 communicating with the bottom of the discharge port 44 serve as an oil discharge passage. For example, when relative rotation occurs in the direction as shown by the inside-blank arrow mark in FIG. 2, the suction hole 42 and the oil groove 33c communicating with the suction port 41 on the left side in the pump room 40 illustrated in the highest position in the drawing serve as an oil suction passage and oil sealingly contained in the oil reserving part T is introduced into the pump room 40 via this oil groove 33c and suction hole 42. Oil thus introduced is rotated while sealingly retained between adjacent two vanes 22, 22 and is increased in pressure as it reaches the right side of the pump room 40. The discharge check valve 46 on the midway of the discharge hole 44 opening in the space sealingly retaining oil therein is opened together with the pressure rise and introduced oil is delivered to the inside of the discharge hole 44 so as to be introduced into the annular grooves 24, 24 on both sides of the rotor proper 20 via the discharge hole 44 and oil guide hole 45 connected to the bottom of the discharge hole 44. Since the annular grooves 24, 24 communicate with the bottoms of the retaining grooves for the vanes 22, 22, . . . , oil introduced as above acts to press the vane 22 radially outward at the bottom of the retaining groove and afterward return to the oil reserving part T through the throttle hole 47.

Circulation of hydraulic oil occurring in this way generates oil pressure in the pump rooms 40, 40, 40 in opposition to resistance of the oil flow on the respective discharge sides, particularly, resistance at the throttle hole 47. The degree of flow resistance corresponds to the quantity of circulating oil which corresponds to the relative rotation speed between the rotor and casing, that is, the degree of rotation speed difference between the first and second output shafts 11 and 12. The intensity of oil pressure generated in each pump room 40 corresponds to the degree of the rotation speed difference. Such oil pressure acts as a control force in the direction in which relative rotations between the rotor and casing are suppressed, whereby development of the rotation speed difference between the first output shaft 11 rotating in association with the rotor and the second output shaft 12 rotating with the casing is controlled by the force increasing with the increase in the rotation speed difference. Thus, even when the vehicle is in such conditions as naturally encountering the occurrence of a large degree of rotation speed difference, for example, in the case that the front wheels are in idle and the rear wheels catch the road, the occurrence of the rotation speed difference is limited. As a result, the force distribution operation as above in the differential gear unit 1 is controlled and the driving force to be transmitted to the rear wheels through the second output shaft 12 is fully ensured. With the driving force transmitted to the road through the rear wheels, the vehicle can be freed from the running condition as described above.

In this way, the action of the speed difference control part 2 is achieved by circulation of oil contained in the oil reserving part T between this part T and the pump rooms 40, 40, 40 so as to repeat pressure rise in each pump room 40 and pressure lowering by the throttle hole 47. When a condition in which a large degree of rotation speed difference between the front and rear wheels continues for a long time such as when the vehicle runs on the snowy road or mountain road, a temperature of hydraulic oil rises and hydraulic oil in the oil reserving part T is exposed to the outdoor air through the pressing member 33, whereby the temperature of hydraulic oil lowers when the vehicle is in halt in a cold environment. Temperature rise and fall of oil causes an increase and decrease in internal pressure of the oil reserving part T following volumetric expansion and contraction of hydraulic oil, respectively. As described earlier, in the apparatus of this invention, internal pressure in the oil reserving part T is introduced into the space 5 through the oil groove 33e and acts on one side of the piston member 6 and the other side of the piston member 6 is biased by the coiled spring 7 in the direction opposite to the direction in which the abovesaid internal pressure acts. Thus, when the internal pressure rises with the temperature rise of oil, the piston member 6 slides in such direction as departing from the side plate 32 with the increase in pressure received thereby and the volume of the space 5 on the side thereof communicating with the oil reserving part T increases. Accordingly, the internal volume of the oil reserving part T is indirectly increased and volumetric expansion of hydraulic oil is absorbed, whereby the rise of the internal pressure is controlled. On the contrary, when the internal pressure of the oil reserving part T lowers with the fall of oil temperature, the piston member 6 slides in such direction as approaching the side plate 32 and the volume reduction of hydraulic oil is absorbed with indirectly decreased internal volume of the oil reserving part T, and the fall of internal pressure is controlled. In the stage of assembling the speed difference control part 2, the oil reserving part T is sealingly filled with hydraulic oil subjected to a determined degree of pressure so that a gap may be developed, as shown in FIGS. 1 and 4, between the piston member 6 and side plate 32 when a temperature of hydraulic oil is at the normal degree. Then, sliding of the piston member 6 toward the side plate 32 is made possible and absorption of volume reduction following the fall of oil temperature within the range until the piston member 6 abuts on the side plate 32. In this way, in the apparatus of this invention, the internal volume of the oil reserving part T is indirectly varied by sliding of the piston member 6 in the axial direction in the space 5 being formed in a part of the casing and communicating with the oil reserving part T, and the volume variation of hydraulic oil is absorbed. The volume variation of hydraulic oil, therefore, can be absorbed without causing a variation in the external shape of the speed difference control part 2 and designing of the apparatus is free of limit such as consideration as to whether the rotary shafts are to be solid or hollow.

The number of round holes 33d formed on the pressing member 33 and forming the space 5 between the pressing member 35 and the side plate 32 is three in this embodiment but may be more than three within the range not impeding formation of oil grooves 33c, 33c, . . . on the side face of the pressing member 33 and screw holes 34a, 34a, . . . . Formation of a large number of spaces 5 enables absorption of a large degree of volume variation with a slight sliding stroke of each piston member 6, whereby thinning of the body of the speed difference control part 2, that is, size reduction in the whole of the hydraulic transmission coupling apparatus is possible. The sectional shape of the space 5 is not limited to be circular as defined by the round hole 33d as in this embodiment, however, the internal surface of the space 5 must be finished with a determined precision for smooth sliding of the piston member 6 and, for easy finishing work, the sectional shape is preferably circular. The position for formation of the space 5 is not limited to be as determined in this embodiment but optional as far as determined in a part of the casing.

The oil hydraulic pump composing the speed difference control part 2 is not limited to be a vane pump as employed in this embodiment and, as a matter of course, may be hydraulic pump of the other type such as trochoidal pump.

In the description of this embodiment, a hydraulic transmission coupling apparatus comprising the speed difference control part 2 employing an oil hydraulic pump for controlling the action of the differential gear unit 1 has been referred to, however, this invention is also applicable to such a structure that an oil hydraulic pump is disposed between the driving wheel directly connected to the engine and the follower wheel, and that the driving force equivalent to hydraulic pressure generated in each of pump rooms in the oil hydraulic pump correspondingly to the rotation speed difference between both wheels is distributed to the side of the follower wheel.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A hydraulic transmission coupling apparatus for a four-wheel drive vehicle, comprising:
a casing rotating about an axis in association with one of the front and rear wheels, wherein said casing comprises:
a cylindrical cam ring having an eccentric interior wall;
two side plates each in the shape of a round plate for closing both sides of said cam ring; and
a pressing member being fitted on one of said two side plates and having a groove and a plurality of round holes at the surface thereof to be in contact with said side plate;
a rotor rotating about said axis in association with the other of the front and rear wheels;
pump means being disposed between said casing and said rotor and generating hydraulic pressure corresponding to a rotation speed difference between said casing and said rotor;
reserving means for reserving hydraulic fluid to be supplied to said pump means and hydraulic fluid discharged from said pump means;
a circulation passage for circulating hydraulic fluid between said pump means and said reserving means;
a fluid room disposed between said casing and said rotor for rotation about said axis, said fluid room being spaced apart from said axis and being in fluid communication with said circulation passage;
wherein said reserving means and said fluid room are provided integrally with said casing; and
a sliding member being provided in said fluid room and sliding while subjected to the pressure of hydraulic fluid at one side thereof.

2. A hydraulic transmission coupling apparatus for four-wheel drive vehicle as set forth in claim 1, wherein said groove and said round hole compose said reserving means and said fluid room, respectively, when said pressing member is fitted on said side plate.

3. A hydraulic transmission coupling apparatus for four-wheel drive vehicle as set forth in claim 1, further comprising:
a spring member for biasing said sliding member in the counter direction to that of the pressure of hydraulic fluid.

4. A hydraulic transmission coupling apparatus for four-wheel drive vehicle as set forth in claim 1, wherein a volume of said hydraulic fluid in said fluid room varies with the sliding of said sliding member.

5. A hydraulic transmission coupling apparatus for four-wheel drive vehicle as set forth in claim 4, wherein the volume of said hydraulic fluid in said fluid room increases as the pressure of said hydraulic fluid in said reserving means rises.

6. A hydraulic transmission coupling apparatus for four-wheel drive vehicle as set forth in claim 1, wherein said hydraulic fluid is oil.

7. The hydraulic transmission coupling apparatus as set forth in claim 1 wherein said sliding member slides in the direction of said axis.

8. A hydraulic transmission coupling apparatus, comprising:
pump means for generating hydraulic pressure corresponding to a rotation speed difference between two rotary shafts which transmit driving force and are connected to said pump means;
reserving means for reserving hydraulic fluid to be supplied to said pump means and hydraulic fluid discharged from said pump means;
a circulation passage for circulating hydraulic fluid between said pump means and said reserving means;

a fluid room disposed in a portion of the coupling apparatus which rotates about an axis for rotation therewith, said fluid room being spaced apart from said axis and being in fluid communication with said circulation passage; and a sliding member being provided in said fluid room and sliding while subjected to the pressure of hydraulic fluid at one side thereof, wherein said sliding member slides in the direction of said axis.

9. A hydraulic transmission coupling apparatus for a four-wheel drive vehicle, comprising:

a casing rotating in association with one of the front and rear wheels, said casing including:

a cylindrical cam ring having an eccentric interior wall;

two side plates each in the shape of a round plate for closing both sides of said cam ring; and a pressing member being fitted on one of said two side plates and having a groove and a plurality of round holes at the surface thereof to be in contact with said side plate;

a rotor rotating in association with the other of the front and rear wheels;

wherein said casing accommodates said rotor therein;

pump means being disposed between said casing and said rotor and generating hydraulic pressure corresponding to a rotation speed difference between said casing and said rotor;

reserving means for reserving hydraulic fluid to be supplied to said pump means and hydraulic fluid discharged from said pump means;

a circulation passage for circulating hydraulic fluid between said pump means and said reserving means;

a fluid room disposed in said circulation passage, wherein said reserving means and said fluid room are provided integrally with said casing; and a sliding member being provided in said fluid room and sliding while subjected to the pressure of hydraulic fluid at one side thereof.

10. A hydraulic transmission coupling apparatus for four-wheel drive vehicle as set forth in claim 9, wherein said groove and said round hole compose said reserving means and said fluid room, respectively, when said pressing member is fitted on said side plate.

* * * * *